United States Patent
Wu et al.

(10) Patent No.: US 6,238,780 B1
(45) Date of Patent: May 29, 2001

(54) MAGNETIC RECORDING MEDIUM COMPRISING MULTILAYERED CARBON-CONTAINING PROTECTIVE OVERCOATS

(75) Inventors: Zhong Stella Wu, Fremont; Rajiv Y. Ranjan, San Jose, both of CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/161,278

(22) Filed: Sep. 28, 1998

Related U.S. Application Data

(60) Provisional application No. 60/082,181, filed on Apr. 16, 1998.

(51) Int. Cl.[7] .................................................. G11B 5/725
(52) U.S. Cl. ........................ 428/213; 428/216; 428/408; 428/694 TC; 427/122; 427/131; 427/577
(58) Field of Search .................................. 428/213, 216, 428/408, 694 TC, 900; 427/122, 131, 577

(56) References Cited

U.S. PATENT DOCUMENTS

| | | | |
|---|---|---|---|
| 5,227,211 | * 7/1993 | Eltookhy et al. | 428/64 |
| 5,785,825 | * 7/1998 | Hwang et al. | 204/192.16 |
| 5,837,357 | * 11/1998 | Matsuo et al. | 428/212 |

OTHER PUBLICATIONS

L. J. Huang, et al., "Characterization of the head–disk interface for proximity recording", IEEE Transaction on Magnetics, vol. 33, Sep. 1997, pp. 3112–3114.

L. J. Huang, et al., "Structure of Nitrogenated Carbon Overcoats on Thin Film Hard Disks", IEEE Transactions on Magnetics, vol. 33, pp. 1–8.

Hsiao-chu Tsai et al., "Critical Review: Characterization of diamondlike carbon films and their application as overcoats on thin–film media for magnetic recording", J. Vac. Sci. Technol. A vol. 5, No. 6, Nov./Dec. 1987, pp. 3287–3312.

* cited by examiner

*Primary Examiner*—Stevan A. Resan
(74) *Attorney, Agent, or Firm*—McDermott, Will & Emery

(57) ABSTRACT

A magnetic recording medium is provided with dual carbon-containing protective overcoats for high magnetic recording performance and high mechanical performance. Embodiments include a dual protective overcoat comprising an amorphous carbon layer on a magnetic layer and a nitrogenated carbon layer on the amorphous carbon layer.

15 Claims, 3 Drawing Sheets

MAGNETIC RECORDING MEDIUM COMPRISING MULTILAYERED CARBON-CONTAINING PROTECTIVE OVERCOATS

RELATED APPLICATION

This application claims priority from provisional patent application Serial No. 60/082,181 filed Apr. 16, 1998, the entire disclosure of which is hereby incorporated by reference herein.

TECHNICAL FIELD

The present invention relates to a magnetic recording medium, particularly a rotatable magnetic recording medium, such as a thin film magnetic disk cooperating with a magnetic transducer head. The invention has particular applicability to high areal recording density magnetic recording media designed for drive programs having reduced flying heights, or pseudocontact/proximity recording.

BACKGROUND ART

Thin film magnetic recording disks and disk drives are conventionally employed for storing large amounts of data in magnetizable form. In operation, a typical contact start/stop (CSS) method commences when a data transducing head begins to slide against the surface of the disk as the disk begins to rotate. Upon reaching a predetermined high rotational speed, the head floats in air at a predetermined distance from the surface of the disk where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too flat, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

Conventional practices for addressing these apparently competing objectives involve providing a magnetic disk with a roughened recording surface to reduce the head/disk friction by techniques generally referred to as "texturing." Conventional texturing techniques involve mechanical polishing or laser texturing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers. The surface of an underlayer can also be textured, and the texture substantially replicated in subsequently deposited layers.

A typical longitudinal recording medium is depicted in FIG. 1 and comprises a substrate 10, typically an aluminum (Al)-alloy, such as an aluminum-magnesium (Al-Mg)-alloy, plated with a layer of amorphous nickelphosphorus (NiP). Alternative substrates include glass, glass-ceramic materials, plastics, silicon and graphite. Substrate 10 typically contains sequentially deposited on each side thereof a chromium (Cr) or Cr-alloy underlayer 11, 11', a cobalt (Co)-base alloy magnetic layer 12, 12', a protective overcoat 13, 13', typically containing carbon, and a lubricant topcoat 14, 14'. Cr underlayer 11, 11' can be applied as a composite comprising a plurality of sub-underlayers 11A, 11A'. Cr underlayer 11, 11', Co-base alloy magnetic layer 12, 12' and protective overcoat 13, 13', typically containing carbon, are usually deposited by sputtering techniques performed in an apparatus containing sequential deposition chambers. A conventional Al-alloy substrate is provided with a NiP plating, primarily to increase the hardness of the Al substrate, serving as a suitable surface to provide a texture, which is substantially reproduced on the disk surface.

In accordance with conventional practices, a lubricant topcoat is uniformly applied over the protective overcoat to prevent wear between the disk and head interface during drive operation. Excessive wear of the protective overcoat increases friction between the head and disk, thereby causing catastrophic drive failure. Excess lubricant at the head-disk interface causes high stiction between the head and disk. If stiction is excessive, the drive cannot start and catastrophic failure occurs. Accordingly, the lubricant thickness must be optimized for stiction and friction.

A conventional material employed for the lubricant topcoat comprises a perfluoro polyether (PFPE) which consists essentially of carbon, fluorine and oxygen atoms. The lubricant is usually dissolved in an organic solvent applied and bonded to the carbon overcoat of the magnetic recording medium by techniques such as thermal treatment, ultraviolet (UV) irradiation and soaking. A significant factor in the performance of a lubricant topcoat is the bonded lube ratio which is the ratio of the amount of lubricant bonded directly to the carbon overcoat of the magnetic recording medium to the amount of lubricant bonded to itself or to a mobile lubricant. Desirably, the bonded lube ratio should be high to realize a meaningful improvement in stiction and wear performance of the resulting magnetic recording medium.

The escalating requirements for high areal recording density impose increasingly greater requirements on thin film magnetic media in terms of coercivity, stiction, squareness, low medium noise and narrow track recording performance. In addition, increasingly high areal recording density and large-capacity magnetic disks require increasingly smaller flying heights, i.e., the distance by which the head floats above the surface of the disk in the CSS drive (head-disk interface). For conventional media design, a decrease in the head to media spacing increases stiction and drive crash, thereby imposing an indispensable role on the carbon-protective overcoat.

There are various types of carbon, some of which have been employed for a protective overcoat in manufacturing a magnetic recording medium. Such types of carbon include hydrogenated carbon, graphitic carbon or graphite and nitrogenated carbon or carbon nitride. These types of carbon are well known in the art and, hence, not set forth herein in great detail. See, for example, L. J. Huang et al., "Structure of Nitrogenated Carbon Overcoats on Thin Film Hard Disks," IEEE Transaction on Magnetics, Vol. 33, 1997; L. J. Huang et al., "Characterization of the head-disk interface for proximity recording," IEEE Transaction on Magnetics, 1997, Vol. 33, pp. 3112–3114; and Tsai et al., "Character Review Characterization of diamond like carbon films and their application as overcoats on thin-film media for magnetic recording," J. Vac. Sci. Technol., A5(6), Nov/Dec, 1987, pp. 3287–3311.

Generally, hydrogenated carbon has a hydrogen concentration of about 5 at. % to about 40 at. %, typically about 20 at. % to about 30 at. %, and does not bond well to a subsequently applied lubricant topcoat by virtue of the passivation of carbon dangling bonds by hydrogen. Accordingly, it is difficult to effectively bond a lubricant topcoat to a hydrogenated carbon protective overcoat at a suitable thickness. Hydrogenated carbon has a lower conductivity due to the elimination of the carbon band-gap states by hydrogen. Hydrogenated carbon also provides effective corrosion protection to an underlying magnetic layer.

Amorphous carbon nitride, sometimes referred to as nitrogenated carbon, generally has a nitrogen to hydrogen concentration ratio of about 5:20 to about 30:0. Carbon nitride generally has more carbon band-gap states than hydrogenated carbon and, hence, a higher conductivity. In addition, carbon nitride contains more dangling bonds than hydrogenated carbon, which dangling bonds promote interactions between lubricant and carbon and, hence, enable the application of a thicker bonded lubricant topcoat. Graphitic carbon or graphite contains substantially no hydrogen and nitrogen and has less band-gap states vis-à-vis nitrogenated carbon but more band-gap states than hydrogenated carbon.

The drive for high areal recording density and, consequently, reduced flying heights, challenges the limitations of conventional practices in manufacturing a magnetic recording medium containing a carbon protective overcoat. For example, a suitable protective overcoat must be capable of preventing corrosion of the underlying magnetic layer, which is an electrochemical phenomenon dependent upon factors such as environmental conditions, e.g., humidity and temperature. In addition, a suitable protective overcoat must prevent migration of ions from underlying layers into the lubricant topcoat and to the surface of the magnetic recording medium forming defects such as asperities. A protective overcoat must also exhibit the requisite surface polarity to enable bonding thereto of a lubricant topcoat in an adequate thickness. A protective overcoat must also exhibit a suitable electrical conductivity. The absence of conductivity may result in the formation of a static charge on the surface of the magnetic recording medium leading to recording and/or reading errors. Furthermore, as the head disk interface decreases to less than 1 microinch, it is necessary to reduce the thickness of the carboncontaining protective overcoat to below the conventional thicknesses employed, e.g., about 200 Å. It is virtually impossible to satisfy such imposing requirements with a conventional protective overcoat material.

Accordingly, there exists a need for a magnetic recording medium comprising a protective overcoat capable of satisfying the imposing demands for high areal recording density and reduced head disk interface. There also exists a need for a magnetic recording medium having a protective overcoat capable of preventing corrosion of the underlying magnetic layer, preventing migration of ions from underlying layers, providing a suitable surface polarity for adequate lubricant bonding and exhibiting suitable conductivity to avoid reading and/or recording errors. There exists a particular need for such a magnetic recording medium exhibiting improved magnetic recording performance, e.g., high remnant coercivity (Hr) and a high signal to noise ratio (SNR).

DISCLOSURE OF THE INVENTION

An object of the present invention is a magnetic recording medium exhibiting high recording performance, a high SNR, and a high area recording density.

Another object of the present invention is a magnetic recording medium comprising a thin protective overcoat capable of preventing corrosion of the underlying magnetic layer, migration of ions from underlying layers, or migration of atoms or ions from the overcoat to the magnetic layer or underlayers, exhibiting a suitable surface polarity for lubricant bonding and a suitable conductivity.

A further object of the present invention is a method of manufacturing a high areal recording density magnetic recording medium exhibiting high recording performance, a high SNR and suitable for use in a drive system with a flying height less than about 1.1 microinch.

Additional objects, advantages and other features of the present invention will be set forth in part in the description which follows and in part will become apparent to those having ordinary skill in the art upon examination of the following disclosure or may be learned from the practice of the present invention. The objects and advantages of the present invention may be realized and obtained as particularly pointed out in the appended claims.

According to the present invention, the foregoing and other objects are achieved in part by a magnetic recording medium comprising an amorphous carbon overcoat and a nitrogenated carbon overcoat deposited thereon.

Another aspect of the present invention is a method of manufacturing a magnetic recording medium, the method comprising depositing an amorphous carbon protective overcoat on a magnetic layer and depositing a nitrogenated carbon overcoat on the amorphous carbon protective overcoat.

Additional objects and advantages of the present invention will become readily apparent to those having ordinary skill in the art from the following detailed description, wherein the embodiments of the present invention are described, simply by way of illustration of the best mode contemplated for carrying out the present invention. As will be realized, the present invention is capable of other and different embodiments, and its several details are capable of modifications in various obvious respects, all without departing from the present invention. Accordingly, the drawings and description are to be regarded as illustrative in nature, and not as restrictive.

DESCRIPTION OF THE INVENTION

The present invention enables the manufacture of magnetic recording media exhibiting improved magnetic recording and mechanical performance suitable for high area recording density in a cost effective, efficient manner. Embodiments of the present invention comprise forming a composite protective overcoat comprising a plurality of carbon-containing layers with an attendant increase in Hr and SNR and a narrower signal pulse. The composite protective overcoat of the present invention further prevents corrosion of the underlying magnetic layer, prevents migration of ions from underlying layers, or migration of atoms or ions from the overcoat to the magnetic layer or underlayer, causing a deterioration of recording performance, enables adequate bonding of a lubricant topcoat thereto at a desirable thickness, such as about 5 Å to about 10 Å, and exhibits a suitable conductivity to avoid reading and/or writing errors.

Embodiments of the present invention include forming a dual carbon-containing protective overcoat comprises a first relatively thin layer of amorphous carbon deposited on a magnetic layer and a second relatively thick layer of nitrogenated carbon deposited on the first amorphous carbon layer thereon. The first carbon layer is typically sputter deposited on a magnetic layer comprising a magnetic material conventionally employed in the manufacture of magnetic recording media, such as a Co alloy, e.g., a cobalt-chromium-platinum alloy, a cobalt-chromium-tantalum alloy or a cobalt-chromium-platinum-tantalum alloy. Magnetic recording media according to the present invention can comprise a single, double or multi-underlayer structure. The underlayer structure is typically sputter deposited on a conventional non-magnetic substrate, such as an Al aluminum alloy substrate or an alternate substrate such as a glass, ceramic or a glass-ceramic substrate. The carbon-containing protective overcoats can be deposited by sputter depositing in a DC magnetron sputtering apparatus employing a base pressure of about $10^{-7}$ Torr. The substrate can be heated to in excess of 100° C. employing a sputtering pressure of about 5 to about 15 mTorr.

In an embodiment of the present invention, a magnetic recording medium is formed with a first layer of amorphous carbon, typically at a thickness of about 1 Å to about 200 Å. A second protective layer comprising nitrogenated carbon is then sputter deposited on the first amorphous carbon layer at a thickness of about 1 Å to about 500 Å. The amorphous carbon protective overcoat layer deposited in accordance with embodiments of the present invention is characterized by degenerate or imperfect graphitic structures and is substantially free of nitrogen, e.g., less than about 5 wt. % nitrogen.

Figure 1:
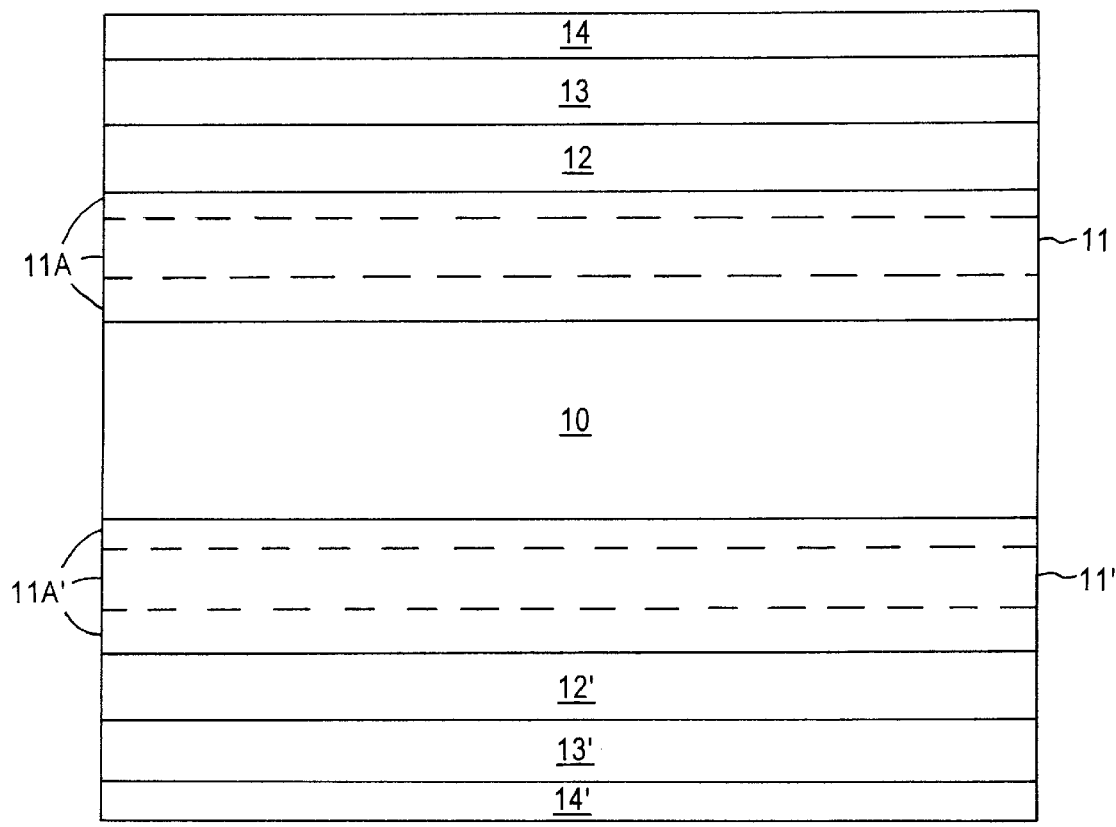
FIG. 1 schematically illustrates a conventional magnetic recording medium.
Figure 2:
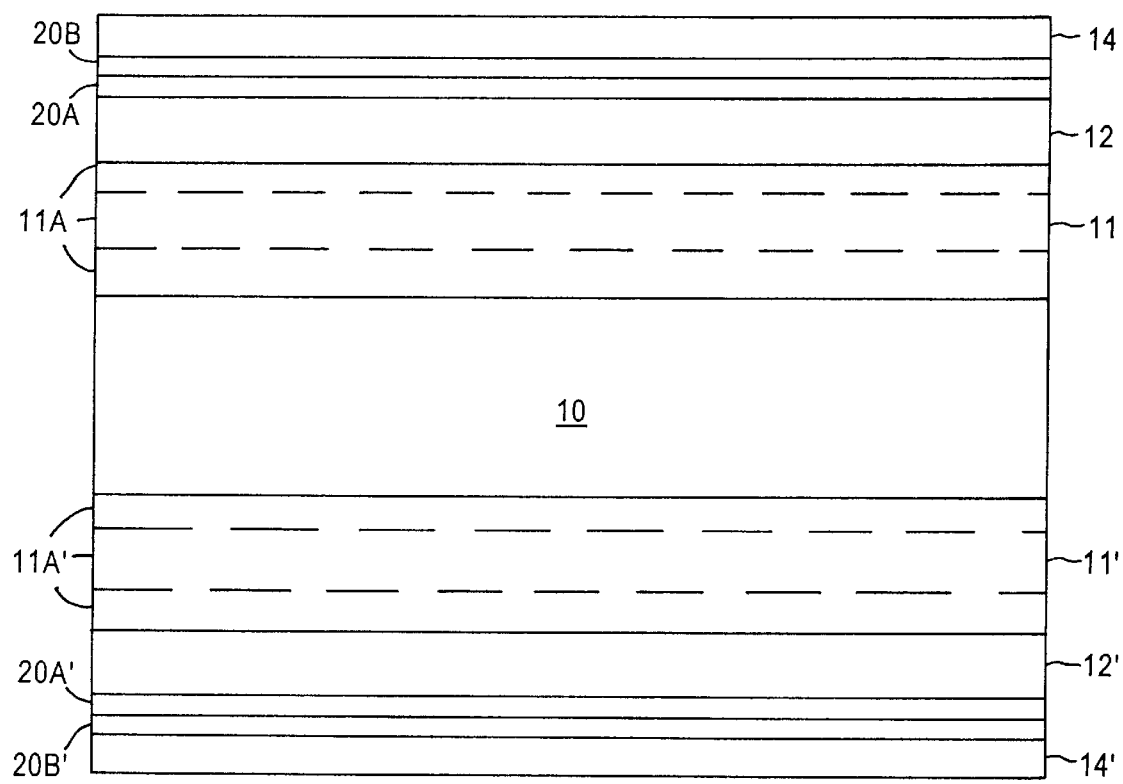
FIG. 2 schematically illustrates a magnetic recording medium in accordance with an embodiment of the present invention.

An embodiment of the present invention is illustrated in FIG. 2, wherein elements similar to those of the conventional magnetic recording illustrated in FIG. 1 bear similar reference numerals. As shown in FIG. 2, substrate 10 is provided sequentially, on each side thereof, with a Cr or Cr-alloy underlayer 11, 11', and a magnetic layer, such as a Co-base alloy layer 12, 12' thereon, as in the FIG. 1 magnetic recording medium. However, the magnetic recording medium in accordance with the present invention departs from the conventional magnetic recording medium illustrated in FIG. 1 in that the protective overcoat comprises a plurality of layers 20A, 20B and 20A', 20B', sequentially formed on magnetic layer 12, 12'. First protective overcoat layer 20A, 20A' comprises amorphous carbon which is substantially free of nitrogen, while second protective overcoat layer 20A, 20B' comprises nitrogenated carbon. A lubricant topcoat 14, 14' is then applied to the second carbon-containing protective overcoat layer 20B, 20B'.

EXAMPLES

Example 1

Two magnetic recording media were prepared employing substantially the same components for the layers which were deposited under substantially the same deposition conditions, except for the protective overcoats. Each magnetic recording medium comprised a NiP plated Al substrate, NiAl/CrV dual underlayer and a magnetic layer comprising CoCrPtTa. One medium (1A) represents a conventional magnetic recording medium containing a single amorphous nitrogenated carbon protective overcoat deposited on the magnetic layer at a thickness of about 100 Å. The second medium (1B) represents an embodiment of the present invention containing dual carbon-containing layers comprising a first amorphous carbon layer deposited on the magnetic layer at a thickness of about 30 Å and a nitrogenated carbon layer deposited thereon at a thickness of about 70 Å. The amorphous carbon layer was sputtered deposited in argon, while the nitrogenated carbon layers were deposited in a mixture of argon and nitrogen gas.

Example 2

Two magnetic recording media were prepared, one conventional (2A) and one representative of the present invention (2B), as in Example 1, except that the magnetic layer comprised CoCrPtTaNb.

Example 3

Two magnetic recording media were prepared, one conventional (3A) and one representative of the present invention (3B), as in Example 1, except that the underlayer comprised a single CrV.

The magnetic properties of the media of Examples 1A–3A and 1B–3B were tested on a non-destructive rotating disk magnetometer. The recording signal and media were measured at 240 kfci(kiloflux reversal per inch) linear density employing a Guzik tester with a MR (magnetoresistive) head having a gap length of 0.5 $\mu$m flying at a height of 1.1 $\mu$inch. The results are reported in FIGS. 3A and 3B comparing the Hr and SNR for the media comprising the single amorphous nitrogenated carbon overcoat with the dual layer overcoat comprising an amorphous carbon layer and a nitrogenated carbon layer deposited thereon.

Figure 3A:
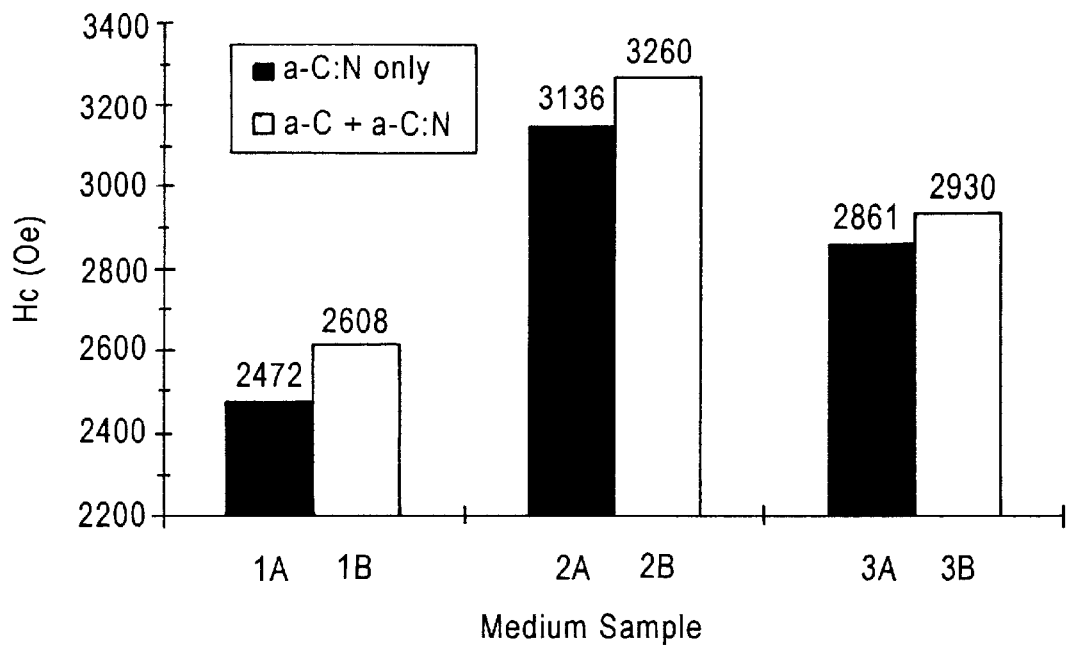
FIGS. 3A and 3B illustrate the Hr and SNR, respectively, of an embodiment of the present invention vis-à-vis a conventional magnetic recording medium.
Figure 3B:
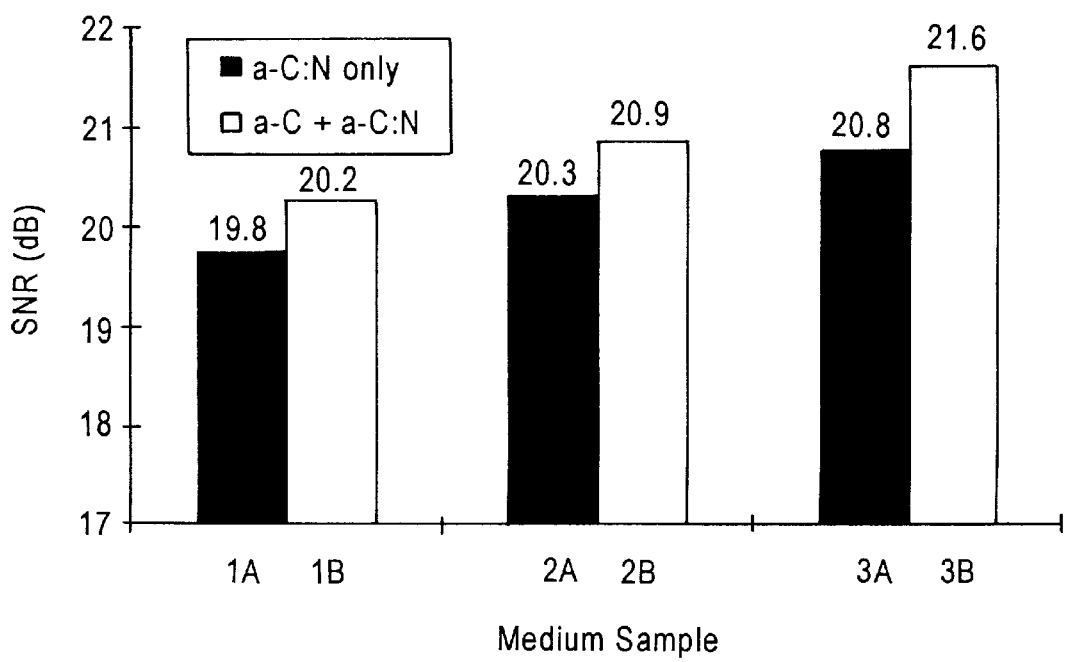

It is apparent from FIGS. 3A and 3B that the dual carbon overcoat film structure in accordance with the present invention provides magnetic recording media exhibiting a significantly higher Hr which results in a shorter data bit length and magnetic transmission length, as well as significantly lower media noise and narrower signal pulse, thereby ensuring quality reading/writing and higher storage density ability. The composite protective overcoat of the present invention also prevents corrosion of the underlying magnetic layer and migration of ions from underlying layers, or the migration of atoms or ions from the carbon overcoat to the magnetic layer which induces deterioration of recording or magnetic performance, and enables suitable lubricant bonding thereto.

The mechanism involved in achieving the superior magnetic recording and writing performance as well as high SNR due by employing a composite carbon-containing overcoat in accordance with the embodiments of the present invention is not known with certainty. However, it is believed that strategic positioning of an amorphous carbon protective overcoat substantially free of nitrogen between the magnetic layer and the nitrogenated carbon overcoat prevents nitrogen diffusion into the magnetic layer, thereby avoiding the formation of a FCC (face centered cubic) phase which exhibits weak magnetocrystalline anisotropy and, hence, lower coercivity. Accordingly, the use of an amorphous carbon protective overcoat containing substantially no nitrogen is believed to preserve the hcp (hexagonal close packed) interface of the magnetic alloy layer.

The magnetic layer employed in the present invention as well as the underlayer structure can be any of those conventionally employed in the manufacture of magnetic recording media. The magnetic alloy layer can comprise any conventional Co alloy layer, such as cobalt-chromium-platinum, cobalt-chromium-tantalum, cobalt-chromium-platinum-tantalum or cobalt-chromium-platium-tantalum-niobium.

The present invention can be employed to produce any of various types of magnetic recording media, including thin film disks. The present invention is particularly applicable in producing high areal recording density magnetic recording media requiring a low flying height.

Only the preferred embodiment of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A magnetic recording medium having a multi layered protective overcoat with a thickness less than about 100 Å and consisting essentially of an amorphous carbon overcoat with substantially no diamond bonds and a nitrogenated carbon overcoat deposited thereon.

2. The magnetic recording medium according to claim 1, wherein:

the amorphous carbon overcoat has a thickness of about 1 Å to about 30 Å;

the nitrogenated carbo n overcoat has a thickness of about 1 Å to about 70 Å, which is greater than the thickness of the amorphous carbon overcoat.

3. The magnetic recording medium according to claim 2, wherein the amorphous carbon overcoat has a thickness less than about 50% of the thickness of the nitrogenated carbon overcoat.

4. The magnetic recording medium according to claim 3, wherein the amorphous carbon overcoat has a thickness of about 5 to less than 50% of the thickness of the nitrogenated carbon overcoat.

5. The magnetic recording medium according to claim 1, wherein the amorphous carbon overcoat is formed on a magnetic layer having a predominant hexagonal close packed crystal structure.

6. The magnetic recording medium according to claim 5, wherein:

the magnetic layer comprises a cobalt alloy.

7. The magnetic recording medium according to claim 6, wherein the magnetic alloy comprises a cobalt-chromium-platinum alloy, a cobalt-chromium-tantalum alloy, a cobalt-chromium-platinum-tantalum alloy, or a cobalt-chromium-platinum-tantalum-niobium alloy.

8. The magnetic recording medium according to claim 5, wherein the magnetic layer is formed on an underlayer which comprises either a single layer or a multilayer structure.

9. The magnetic recording medium according to claim 5, comprising:

a non-magnetic substrate;

at least one underlayer on the non-magnetic substrate; and the magnetic layer on the underlayer.

10. The magnetic recording medium according to claim 1, wherein the amorphous layer contains substantially no nitrogen.

11. A method of manufacturing a magnetic recording medium, the method comprising:

depositing an overcoat consisting essentially of amorphous carbon with substantially no diamond bonds on a magnetic layer; and depositing a nitrogenated carbon overcoat on the amorphous carbon protective overcoat, wherein the combined thickness of the amorphous carbon overcoat and the nitrogenated carbon overcoat is less than about 100 Å.

12. The method according to claim 11, comprising:

sputter depositing the amorphous carbon overcoat in a gaseous atmosphere comprising argon or argon and hydrogen; and sputter depositing the nitrogenated carbon overcoat in an atmosphere comprising argon and nitrogen.

13. The method according to claim 12, comprising:

sputter depositing the amorphous carbon overcoat in a gaseous atmosphere comprising argon and about 1 to about 50 volume percent hydrogen; and sputter depositing the nitrogenated carbon protective overcoat in a gaseous atmosphere comprising nitrogen and argon, with the nitrogen volume ranging from about 5% to about 50%.

14. The method according to claim 11, wherein the amorphous carbon overcoat contains substantially no nitrogen.

15. The method according to claim 11, wherein:

the amorphous carbon overcoat has a thickness of about 1 Å to about 30 Å; and the nitrogenated carbon overcoat has a thickness of about 1 Å to about 70 Å.

* * * * *